US011025338B1

(12) United States Patent
Mondal et al.

(10) Patent No.: US 11,025,338 B1
(45) Date of Patent: Jun. 1, 2021

(54) METHOD AND SYSTEM FOR IDENTIFYING AND MITIGATING INTERFERENCE CAUSED BY ROGUE LI-FI ACCESS POINT

(71) Applicant: Wipro Limited, Bangalore (IN)

(72) Inventors: Subhas Chandra Mondal, Bangalore (IN); Shailesh Prabhu, Manipal (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/817,922

(22) Filed: Mar. 13, 2020

(30) Foreign Application Priority Data

Mar. 5, 2020 (IN) .............................. 202041009525

(51) Int. Cl.
| | |
|---|---|
| *H04B 10/11* | (2013.01) |
| *H04B 10/079* | (2013.01) |
| *H04B 10/66* | (2013.01) |
| *H04B 10/50* | (2013.01) |
| *H04B 10/116* | (2013.01) |
| *H04B 1/10* | (2006.01) |
| *H04W 88/08* | (2009.01) |
| *H04L 29/06* | (2006.01) |
| *H04W 12/122* | (2021.01) |
| *H04B 10/07* | (2013.01) |

(52) U.S. Cl.
CPC ....... *H04B 10/0795* (2013.01); *H04B 10/116* (2013.01); *H04B 10/502* (2013.01); *H04B 10/66* (2013.01); *H04B 1/1027* (2013.01); *H04B 10/07* (2013.01); *H04B 10/11* (2013.01); *H04L 63/14* (2013.01); *H04L 63/1441* (2013.01); *H04W 12/122* (2021.01); *H04W 88/08* (2013.01)

(58) Field of Classification Search
CPC .. H04B 10/0795; H04B 10/116; H04B 10/66; H04B 10/502; H04B 10/11; H04B 10/07; H04B 1/1027; H04L 63/14; H04L 63/1441; H04W 88/08; H04W 12/122
USPC .......................... 398/9–38, 43–103, 118–131
See application file for complete search history.

(56) References Cited

U.S. PATENT DOCUMENTS

| | | | |
|---|---|---|---|
| 7,346,338 B1 * | 3/2008 | Calhoun ............. | H04L 63/1408 455/411 |
| 7,453,840 B1 | 11/2008 | Dietrich et al. | |

(Continued)

OTHER PUBLICATIONS

Anmulwar et al, Rogue Access Point Detection Methods a Review, Feb. 2014, ICICES, All Document. (Year: 2014).*

*Primary Examiner* — Dibson J Sanchez
(74) *Attorney, Agent, or Firm* — Finnegan, Henderson, Farabow, Garrett & Dunner, LLP

(57) ABSTRACT

A method and system for identifying and mitigating interference caused by a rogue Light Fidelity (Li-Fi) access point in a Li-Fi communication network is disclosed. The method includes detecting interference caused by the rogue Li-Fi access point in a first set of Light Emitting Diodes (LEDs) from a plurality of LEDs within the Li-Fi access point. The plurality of LEDs is arranged in a predefined pattern within the Li-Fi access point, and wherein a coverage area associated with the Li-Fi access point is equally divided amongst the plurality of LEDs. The method further includes disabling data transmission from the first set of LEDs in response to detecting the interference. The method further includes enabling data transmission from a second set of LEDs from the plurality of LEDs. The second set of LEDs is unaffected by interference caused by the rogue Li-Fi access point.

15 Claims, 7 Drawing Sheets

(56) References Cited

U.S. PATENT DOCUMENTS

| | | |
|---|---|---|
| 7,962,958 B2 | 6/2011 | Robert et al. |
| 9,137,670 B2 | 9/2015 | Gray et al. |
| 9,178,896 B2* | 11/2015 | Atreya ................ H04W 12/122 |
| 2005/0060576 A1* | 3/2005 | Kime .................... H04W 24/00 |
| | | 726/4 |
| 2005/0171720 A1* | 8/2005 | Olson ................ H04W 12/122 |
| | | 702/121 |
| 2006/0068811 A1* | 3/2006 | Adya ................ H04W 12/122 |
| | | 455/456.2 |
| 2006/0292988 A1* | 12/2006 | Yuen .................... H04B 17/373 |
| | | 455/62 |
| 2007/0079376 A1* | 4/2007 | Robert ................ H04L 63/1441 |
| | | 726/23 |
| 2007/0099596 A1* | 5/2007 | Prest .................... H04W 12/12 |
| | | 455/410 |
| 2010/0222008 A1* | 9/2010 | Astely .................... H04L 1/003 |
| | | 455/67.11 |
| 2018/0262269 A1* | 9/2018 | Grevers, Jr. .............. G02B 5/22 |
| 2019/0149994 A1* | 5/2019 | Van Antwerp ........ H04W 12/06 |
| | | 726/4 |
| 2020/0120506 A1* | 4/2020 | Kannan ................ H04W 12/06 |
| | | 726/4 |
| 2020/0195343 A1* | 6/2020 | Solanki ................ H04W 88/16 |
| 2020/0336914 A1* | 10/2020 | Kaushik ............. H04W 12/122 |
| 2020/0382958 A1* | 12/2020 | Wang ................ H04B 10/1149 |

* cited by examiner

METHOD AND SYSTEM FOR IDENTIFYING AND MITIGATING INTERFERENCE CAUSED BY ROGUE LI-FI ACCESS POINT

TECHNICAL FIELD

This disclosure relates generally to Light Fidelity (Li-Fi) communication networks, and more particularly to a method and system for identifying interference caused by a rogue Li-Fi access point in a Li-Fi communication network.

BACKGROUND

Optical Wireless Communication (OWC) involves communication over a light channel by a Transmit-Receive pair. Li-Fi and Optical Camera Communication (OCC) are two forms of OWC. In Li-Fi, as defined in the IEEE standard 802.15.7, the transmitter transmits information using a single Light Emitting Diode (LED). The information may be coded using various modulation techniques such as On-Off Keying (OOK), Pulse Position Modulation (PPM), Color Shift Keying (CSK), etc. The receiver includes a photo detector to receive and decode the information.

Conventional interference identification and mitigation methods and systems do not disclose identifying and mitigating Li-Fi interference between a Li-Fi access point associated with a coordinator and a rogue Li-Fi access point.

SUMMARY

In one embodiment, a method for identifying interference caused by a rogue Light Fidelity (Li-Fi) access point in a Li-Fi communication network is disclosed. In one example, the method includes receiving, by an interference management device, a plurality of uplink data frames sent by a User Equipment (UE). Each of the plurality of uplink data frames includes a current Channel Quality Indication (CQI) and a current Received Signal Strength Indicator (RSSI). The method further includes comparing, by the interference management device, the current CQI with at least one preceding CQI associated with the UE and the current RSSI with at least one preceding RSSI associated with the UE. The method further includes detecting, by the interference management device, an interference between a serving Li-Fi access point associated with the UE and a non-serving Li-Fi access point, when the current CQI is less than the at least one preceding CQI and the current RSSI is greater than the at least one preceding RSSI. The method further includes establishing, by the interference management device, the non-serving Li-Fi access point as the rogue Li-Fi access point, when the non-serving Li-Fi access point is not registered with a master coordinator within the Li-Fi communication network.

In another embodiment, a method for mitigating interference by a rogue Light Fidelity (Li-Fi) access point in a Li-Fi communication network is disclosed. In one example, the method includes detecting, by a Li-Fi access point, interference caused by the rogue Li-Fi access point in a first set of Light Emitting Diodes (LEDs) from a plurality of LEDs within the Li-Fi access point. The plurality of LEDs may be arranged in a predefined pattern within the Li-Fi access point. A coverage area associated with the Li-Fi access point is equally divided amongst the plurality of LEDs. The method further includes disabling, by the Li-Fi access point, data transmission from the first set of LEDs in response to detecting the interference. The method further includes enabling, by the Li-Fi access point, data transmission from a second set of LEDs from the plurality of LEDs. The second set of LEDs is unaffected by interference caused by the rogue Li-Fi access point.

In yet another embodiment, an interference management device for identifying interference caused by a rogue Light Fidelity (Li-Fi) access point in a Li-Fi communication network is disclosed. The interference management device includes a processor and a computer readable medium operatively coupled to the processor. The computer readable medium comprises processor instructions, which when executed by the processor, cause the processor to receive a plurality of uplink data frames sent by a User Equipment (UE), wherein each of the plurality of uplink data frames comprises a current Channel Quality Indication (CQI) and a current Received Signal Strength Indicator (RSSI). The processor instructions further cause the processor to compare the current CQI with at least one preceding CQI associated with the UE and the current RSSI with at least one preceding RSSI associated with the UE. The processor instructions cause the processor to detect an interference between a serving Li-Fi access point associated with the UE and a non-serving Li-Fi access point, when the current CQI is less than the at least one preceding CQI and the current RSSI is greater than the at least one preceding RSSI. The processor instructions further cause the processor to establish the non-serving Li-Fi access point as the rogue Li-Fi access point, when the non-serving Li-Fi access point is not registered with a master coordinator within the Li-Fi communication network.

In another embodiment, a Light Fidelity (Li-Fi) access point for mitigating interference caused by a rogue Li-Fi access point is disclosed. The Li-Fi access point includes a plurality of Light Emitting Diodes (LEDs) arranged in a predefined pattern within the Li-Fi access point. A coverage area associated with the Li-Fi access point is equally divided amongst the plurality of LEDs. The Li-Fi access point further includes a controller communicatively coupled to each of the plurality of LEDs. The controller is configured to detect interference in a first set of LEDs from the plurality of LEDs caused by a rogue Li-Fi access point. Further, the controller is configured to disable data transmission from the first set of LEDs in response to detecting the interference. Further, the controller is configured to enable data transmission from a second set of LEDs from the plurality of LEDs. The second set of LEDs is unaffected by interference caused by the rogue Li-Fi access point.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
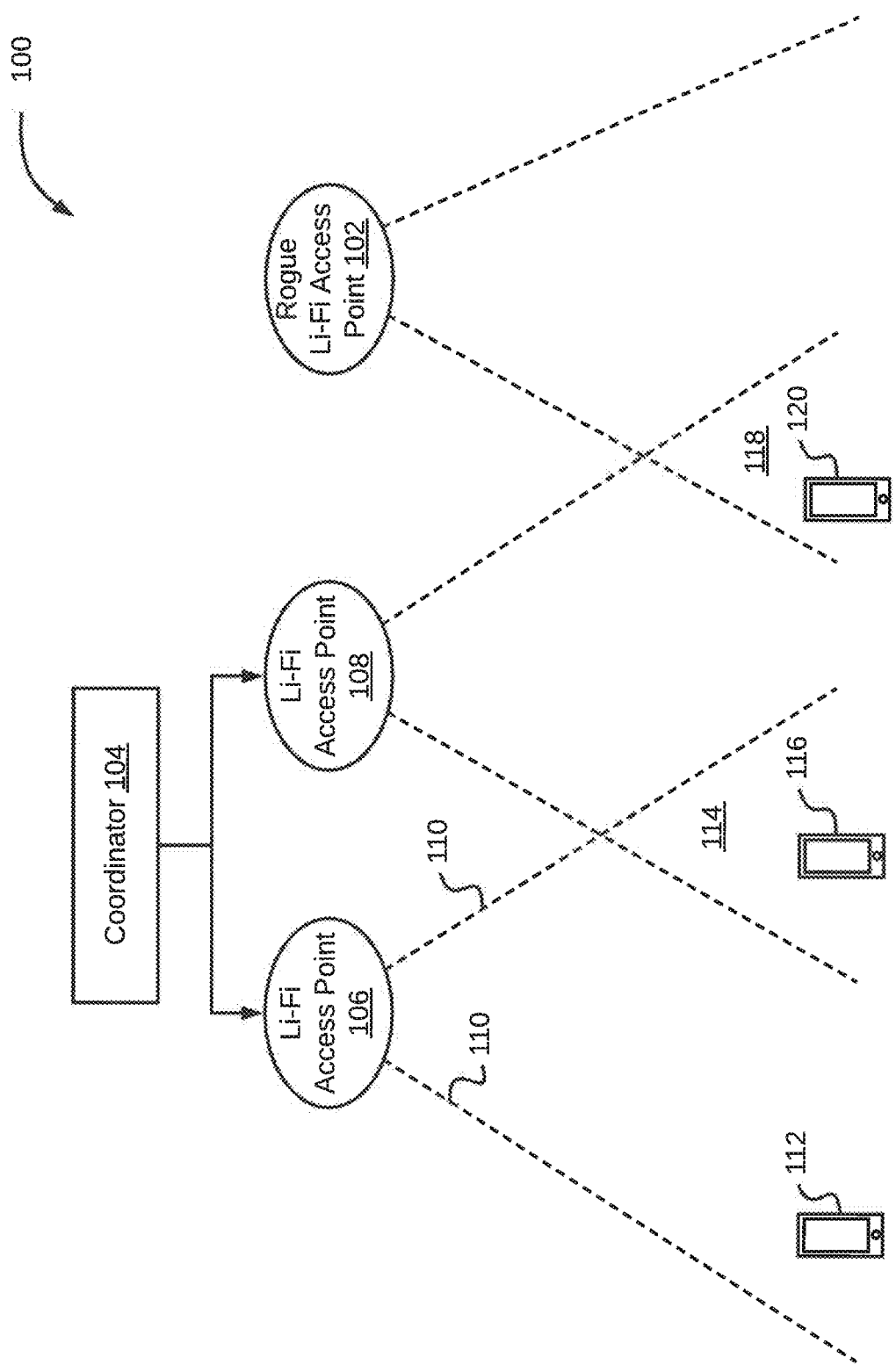
FIG. 1 illustrates an exemplary Light Fidelity (Li-Fi) communication network where various embodiments may be employed.

In FIG. 1, an exemplary Light Fidelity (Li-Fi) communication network 100 where various embodiments may be employed, is illustrated. The Li-Fi communication network 100 may include a rogue Li-Fi access point 102 that may lead to interference in the Li-Fi communication network 100. The Li-Fi communication network 100 may include a coordinator 104 that may manage a plurality of Li-Fi access points (for example, a Li-Fi access point 106 and a Li-Fi access point 108). Each of the plurality of access points are registered with the coordinator 104. As will be appreciated, each of the plurality of Li-Fi access points may include a plurality of Light Emitting Diodes (LEDs) for transmitting data signals in form of modulated light signals. In some embodiments, the Li-Fi access point 106 may transmit data signals over a data signal region 110. In some embodiments, a User Equipment (UE) 112, located within the data signal region 110, may receive the data signals from the Li-Fi access point 106. As will be appreciated, the UE 112 may be a computing device with Li-Fi support (for example, a server, a desktop, a laptop, a notebook, a netbook, a tablet, a smartphone, a mobile phone, or the like) or any additional device providing Li-Fi compatibility (for example, a dongle, a Li-Fi sleeve, or the like) to a computing device.

Further, the data signal region 110 may interfere with a data signal region of the Li-Fi access point 108 to produce a first interference region 114. In some embodiments, a UE 116 may be located within the first interference region 114. As will be appreciated, the UE 116 may not receive data signals in the first interference region 114. In such embodiments, the coordinator 104 may manage, identify, and mitigate interference between the plurality of Li-Fi access points 106 and 108 by selectively switching on and off data transmission from at least one of the Li-Fi access points 106 and 108 based on associated Channel Quality Indication (CQI) and a Received Signal Strength Indicator (RSSI). However, in some embodiments, the data signal region of the Li-Fi access point 108 may interfere with a data signal region of the rogue Li-Fi access point 102 to produce a second interference region 118. It may be noted that the rogue Li-Fi access point 102 is a Li-Fi access point that is not registered with the coordinator 104 or any other coordinator for that matter. In such embodiments, the coordinator 104 may fail to mitigate the interference in the second interference region 118 and a UE 120, located within the second interference region 118, may not receive data signals.

Figure 2:
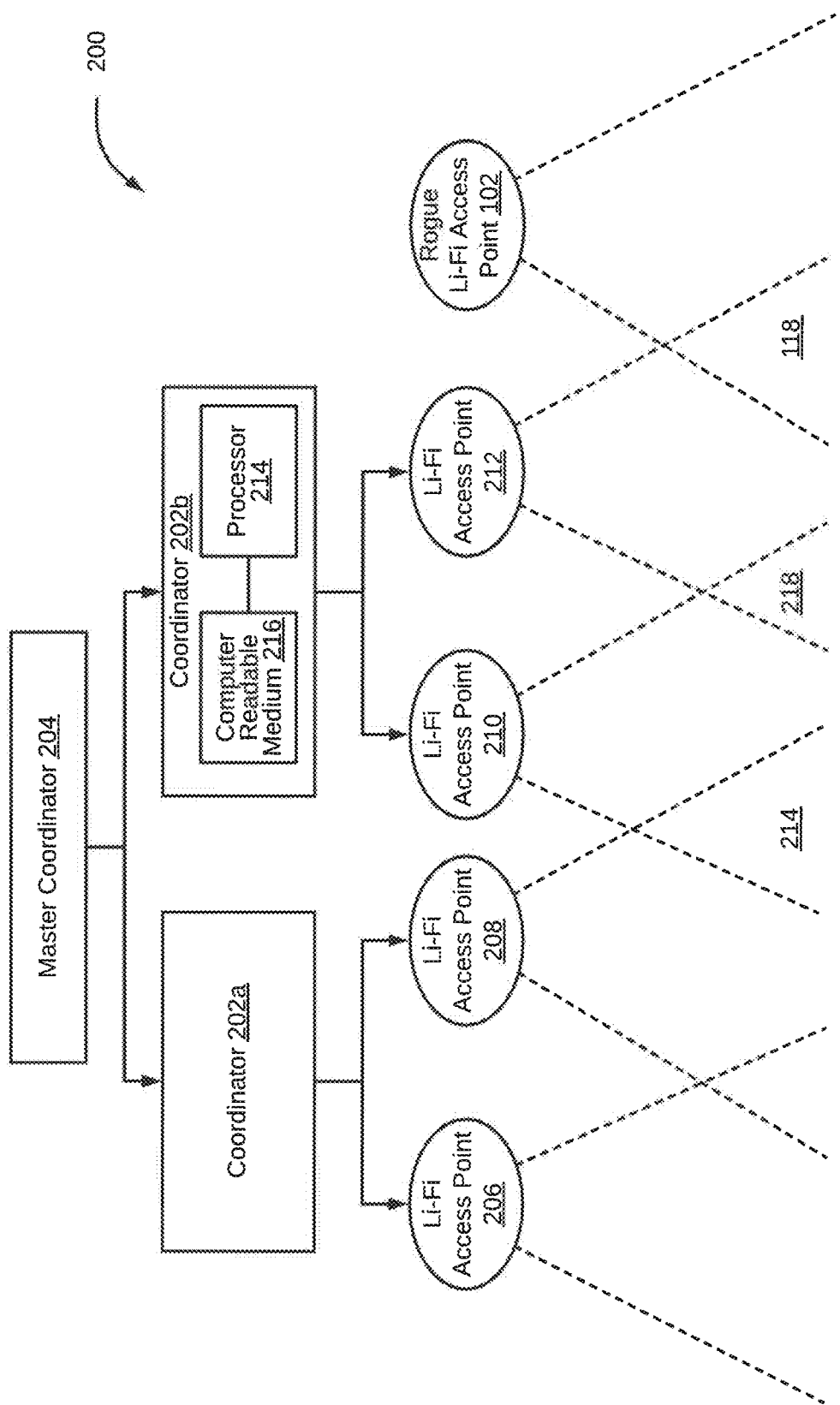
FIG. 2 is a block diagram of a system for identifying and mitigating interference caused by a rogue Li-Fi access point in a Li-Fi communication network, in accordance with some embodiments.

Referring now to FIG. 2, a block diagram of a system 200 for identifying and mitigating interference caused by the rogue Li-Fi access point 102 in a Li-Fi communication network is illustrated, in accordance with some embodiments. The system 200 includes a coordinator 202a, a coordinator 202b, and a master coordinator 204. The master coordinator 204 manages the coordinators 202a and 202b. The coordinator 202a may be connected to a Li-Fi access point 206 and a Li-Fi access point 208 and the coordinator 202b may be connected to a Li-Fi access point 210 and a Li-Fi access point 212.

Further, each of the coordinators 202a and 202b may include a processor 214 and a computer readable medium 216 for storing processor-executable instructions. For ease of explanation, only the coordinator 202b is depicted as including the processor 214 and the computer readable medium 216, The computer readable medium 216 may store instructions that, when executed by the processor 214, may cause the processor 214 to manage interference in the Li-Fi communication network, in accordance with various embodiments. The computer readable medium 216 may also store various data (for example, unique phase of each of the Li-Fi access points 210 and 212, information of each of a plurality of UEs 112, 116, and 120 in vicinity of at least one of the Li-Fi access points 210, and 212, or the like) that may be captured, processed, and/or required by the coordinator 202b. The coordinator 202b may interact with the Li-Fi access points 210 and 212 for sending or receiving various data. The coordinator 202b may also interact with the plurality of UEs 112, 116, and 120 for receiving various data, via, one or more of the Li-Fi access points 210 and 212.

It may further be noted that the master coordinator 204 may also include a processor and a computer readable medium (not shown in FIG. 2). In an embodiment, the data signal region of the Li-Fi access point 210 may interfere with the data signal region of the Li-Fi access point 212 to produce a first interference region 218. In a similar manner, as has already been explained in conjunction with FIG. 1 for the coordinator 104, the coordinator 202b may identify and mitigate the first interference region 218. Similarly, interference between data signal regions of the Li-Fi access point 206 and the Li-Fi access point 208 may be identified and mitigated by the coordinator 202a.

In another embodiment, the data signal region of the Li-Fi access point 210 may interfere with the data signal region of the Li-Fi access point 208. It may be noted that the Li-Fi access point 210 is controlled by the coordinator 202b and the Li-Fi access point 208 is controlled by the coordinator 202a. In such an embodiment, the master coordinator 204 may identify and mitigate the interference between the data signal regions of the Li-Fi access point 210 and the Li-Fi access point 208. In yet another embodiment, the data signal region of the Li-Fi access point 212 may interfere with the data signal region of the rogue Li-Fi access point 102. As has been discussed in conjunction with FIG. 1, the rogue Li-Fi access point 102 is not registered with the coordinator 202b, the coordinator 202a or with any other coordinator in the exemplary Li-Fi communication network. In such an embodiment, at least one of the coordinator 202b, the coordinator 202a, and the master coordinator 204 may disable a first set of Light Emitting Diodes (LEDs) from a plurality of LEDs within the Li-Fi access point 212. It may be noted that the data signal region of each of the first set of LEDs interferes with the data signal region of the rogue Li-Fi access point 102. This is further explained in detail in conjunction with FIG. 6.

An interference between the Li-Fi access point 210 and the Li-Fi access point 212 may be mitigated through the master coordinator 204. The master coordinator 204 may receive interference information from each of the coordinator 202a and the coordinator 202b.

It may be noted that the interference may be mitigated when an interfering Li-Fi access point is associated with a coordinator and interference may only be cancelled/reduced when an interfering Li-Fi access point is a rogue Li-Fi access point. Moreover, some embodiments disclose a method of detecting whether an interfering Li-Fi access point is coordinated or not.

Figure 3:
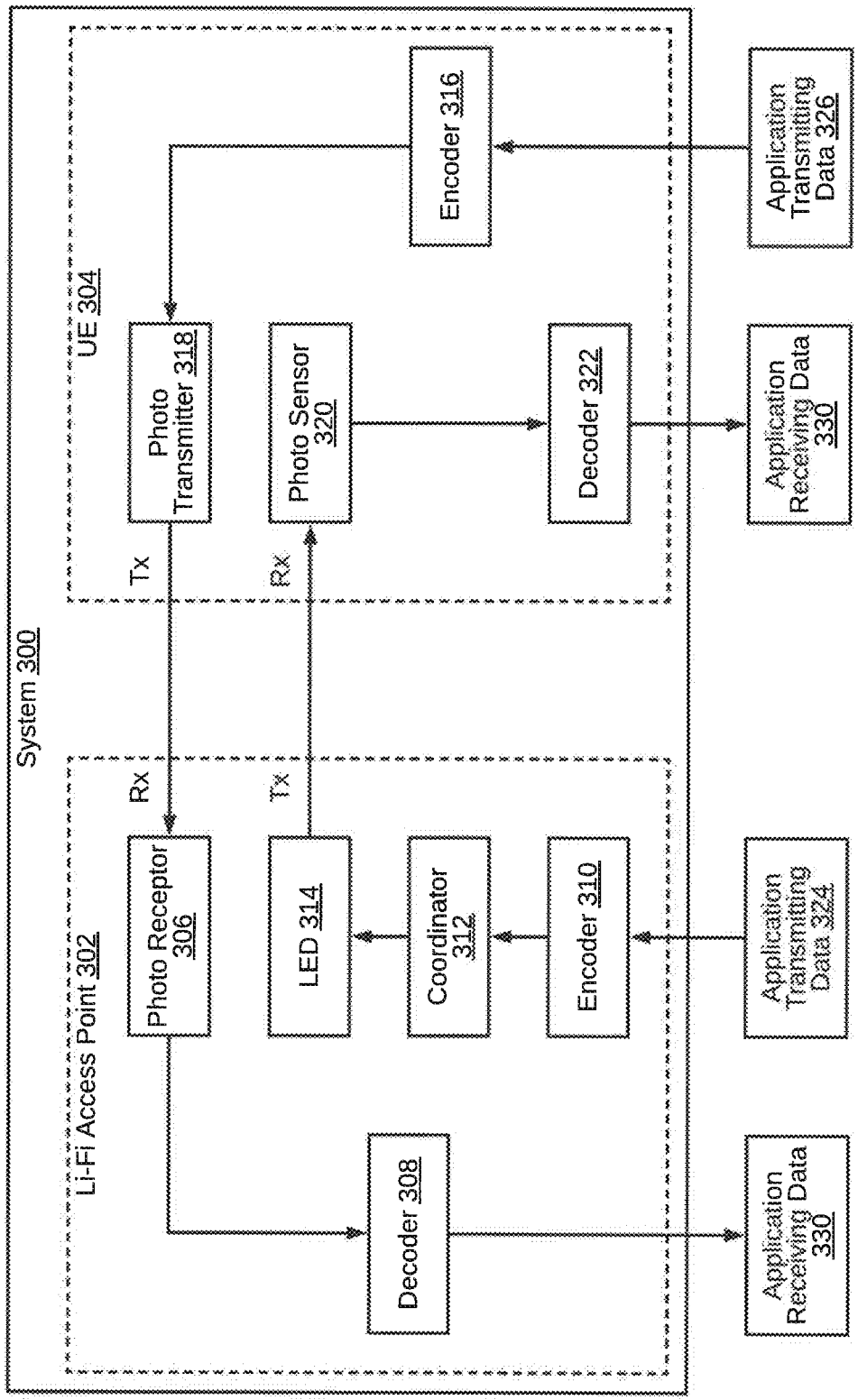
FIG. 3 is a functional block diagram of a system for identifying and mitigating interference caused by a rogue Li-Fi access point in a Li-Fi communication network, in accordance with some embodiments.

Referring now to FIG. 3, a functional block diagram of a system 300 for identifying and mitigating interference caused by the rogue Li-Fi access point 102 in a Li-Fi communication network is illustrated, in accordance with some embodiments. The system 300 may include a Li-Fi access point 302 and a UE 304. The Li-Fi access point 302 may include a photo receptor 306, a decoder 308, an encoder 310, a coordinator 312, and one or more Light Emitting Diode (LED) 314. In some embodiments, the photo receptor 306 may be an Infrared (IR) receiver.

Further, the UE 304 may also include an encoder 316, a photo transmitter 318, a photo sensor 320, and a decoder 322. In some embodiments, the photo transmitter 318 may be an IR transmitter. The LED 314 and the photo sensor 320 may together form a downlink transmission reception system. Further, the photo transmitter 318 and the photo receptor 306 may together form an uplink transmission reception system. The UE 304 may transmit data in form of a plurality of uplink frames to the Li-Fi access point 302 through the uplink photo transmission reception system. Application transmitting data 324 and 326 and application receiving data 328 and 330 may interface with the downlink transmission reception system and the uplink transmission reception system respectively, in order to transmit and receive data. In some embodiments, the Li-Fi access point 302 may be analogous to at least one of the plurality of Li-Fi access points 210 and 212 of the system 200, and the UE 304 may be analogous to at least one of the plurality of UEs 112, 116, and 120.

Figure 4:
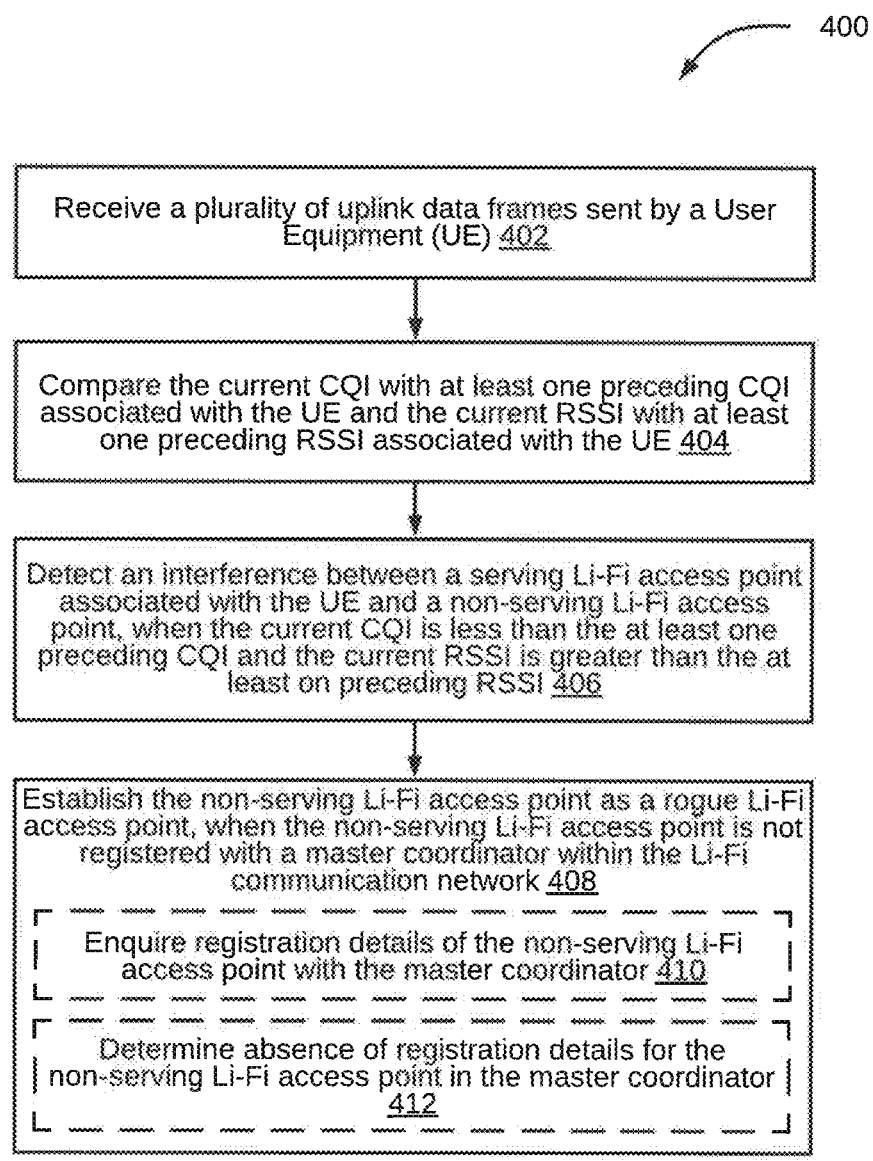
FIG. 4 is a flow diagram of an exemplary control logic for identifying interference caused by a rogue Li-Fi access point in a Li-Fi communication network, in accordance with some embodiments.

Referring now to FIG. 4, an exemplary control logic 400 for identifying interference caused by a rogue Li-Fi access point in a Li-Fi communication network is disclosed via a flowchart, in accordance with some embodiments. In an embodiment, the control logic 400 may be executed by a system, such as the system 200, the coordinator 202b, or the master coordinator 204. As illustrated in the flowchart, the control logic 400 may include receiving, by an interference management device, a plurality of uplink data frames sent by a UE, at step 402. The interference management device may be a coordinator (for example, the coordinator 202b) or the master controller 204. Alternatively, the interference management device may be an independent device that is in communication with the coordinator or the master controller 204. It may be noted that each of the plurality of uplink data frames includes a current CQI and a current RSSI, The control logic 400 may further include comparing the current CQI with at least one preceding CQI associated with the UE and the current RSSI with at least one preceding RSSI associated with the UE, at step 404. The control logic 400 may further include detecting, by the interference management device, at step 406, an interference between a serving Li-Fi access point associated with the UE and a non-serving Li-Fi access point, when the current CQI is less than the at least one preceding CQI and the current RSSI is greater than the at least one preceding RSSI.

It may be notes that a plurality of Li-Fi access points are registered through a set of coordinators, with the master coordinator 204. It may be noted that the plurality of Li-Fi access points may include the serving Li-Fi access point. The control logic 400 may further include establishing, by the interference management device, the non-serving Li-Fi access point as the rogue Li-Fi access point, when the non-serving Li-Fi access point is not registered with the master coordinator 204 within the Li-Fi communication network, at step 408. In some embodiments, the step 408 of the control logic 400 may further include enquiring registration details of the non-serving Li-Fi access point with the master coordinator 204, at step 410. Further, the step 408 of the control logic 400 may include determining absence of registration details for the non-serving Li-Fi access point in the master coordinator 204, at step 412.

Figure 5:
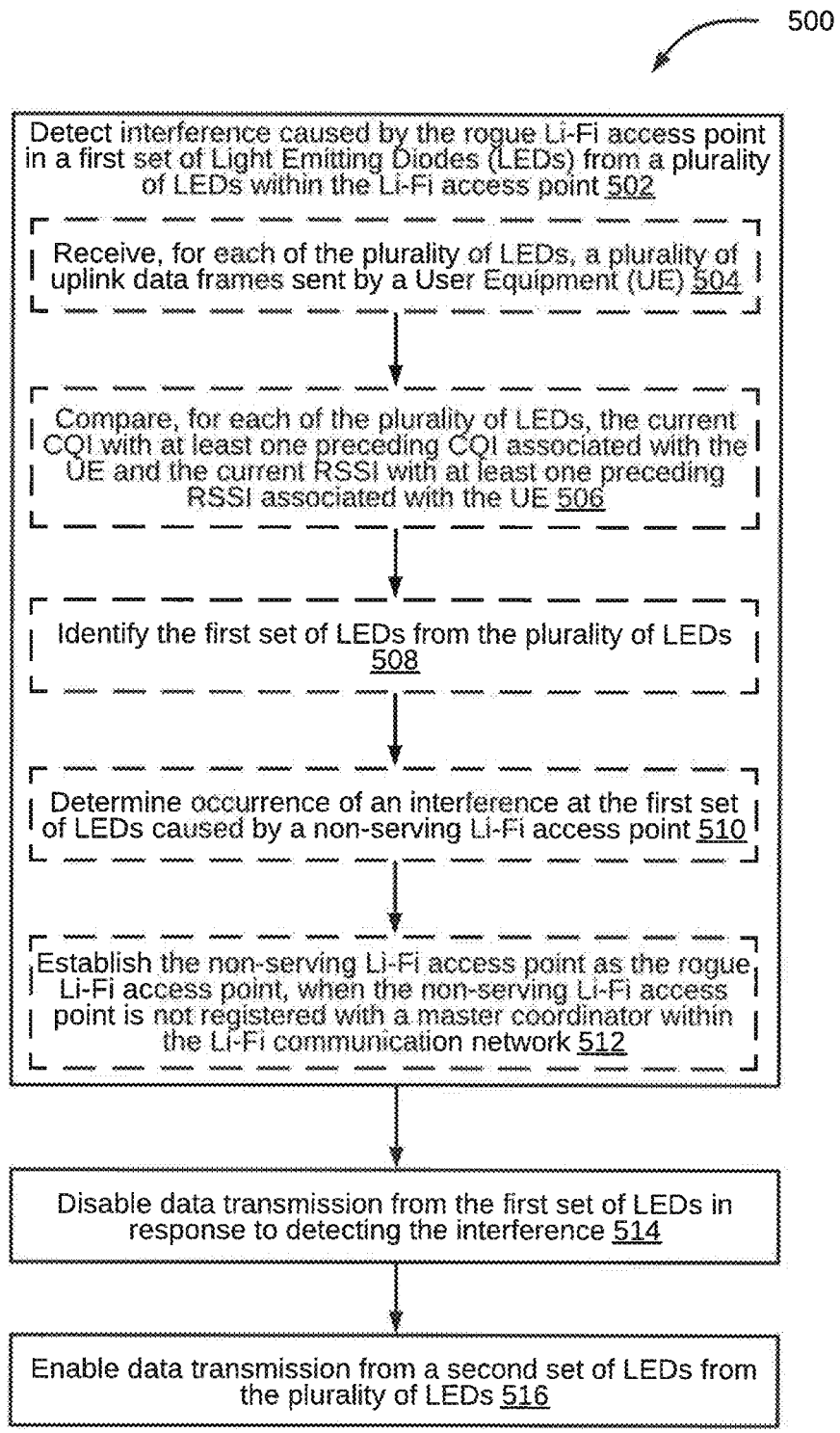
FIG. 5 is a flow diagram of an exemplary control logic for mitigating interference caused by a rogue Li-Fi access point in a Li-Fi communication network, in accordance with some embodiments.

Referring now to FIG. 5, an exemplary control logic 500 for mitigating interference caused by the rogue Li-Fi access point 102 in a Li-Fi communication network is depicted via a flow chart, in accordance with some embodiments. As illustrated in the flowchart, the control logic 500 may include detecting, by a Li-Fi access point, interference caused by the rogue Li-Fi access point 102 in a first set of LEDs from a plurality of LEDs within the Li-Fi access point, at step 502. The Li-Fi access point, for example, may be the Li-Fi access point 212. It may be noted that the plurality of LEDs may be arranged in a predefined pattern within the Li-Fi access point. It may also be noted that a coverage area associated with the Li-Fi access point is equally divided amongst the plurality of LEDs. By way of an example, the Li-Fi access point 212 may have a coverage area of 150 degree and may include 10 LEDs. In this case, each of the 10 LEDs may have a coverage area of 15 degrees. Further, the step 502 of the control logic 500 may include receiving, for each of the plurality of LEDs, a plurality of uplink data frames sent by a UE, at step 504. It may be noted that each of the plurality of uplink data frames may include a current CQI and a current RSSI. In continuation of the above example, the Li-Fi access point 212 receives a current CQI and a current RSSI for each of the 10 LEDs. Further, the step 502 of the control logic 500 may include comparing, for each of the plurality of LEDs, the current CQI with at least one preceding CQI associated with the UE and the current RSSI with at least one preceding RSSI associated with the UE, at step 506. In continuation of the above example, the Li-Fi access point 212 performs the comparison for each of the 10 LEDs.

The step 502 of the control logic 500 may also include identifying the first set of LEDs from the plurality of LEDs, at step 508. It may be noted that for each of the first set of LEDs, the current CQI is less than the at least one preceding CQI and the current RSSI is greater than the at least on preceding RSSI. In continuation of the example given above, for three LEDs in the Li-Fi access point 212, the current CQI may be less than the at least one preceding CQI and the current RSSI may be greater than the at least on preceding RSSI. Further, the step 502 of the control logic 500 may include determining occurrence of an interference at the first set of LEDs caused by a non-serving Li-Fi access point, at step 510. Further, the step 502 of the control logic 500 may include establishing the non-serving Li-Fi access point as the rogue Li-Fi access point 102, when the non-serving Li-Fi access point is not registered with the master coordinator 205, at step 512. Further, the control logic 500 may include disabling, by the Li-Fi access point, data transmission from the first set of LEDs in response to detecting the interference, at step 514. In continuation of the example given above, the Li-Fi access point 212 may disable data transmission for the three LEDs. Further, the control logic 500 may include enabling, by the Li-Fi access point, data transmission from a second set of LEDs from the plurality of LEDs, at step 516. It may be noted that the second set of LEDs may be unaffected by interference caused by the rogue Li-Fi access point 102. In continuation of the example given above, the Li-Fi access point 212 may enable data transmission from other seven LEDs from the ten LEDs.

Figure 6:
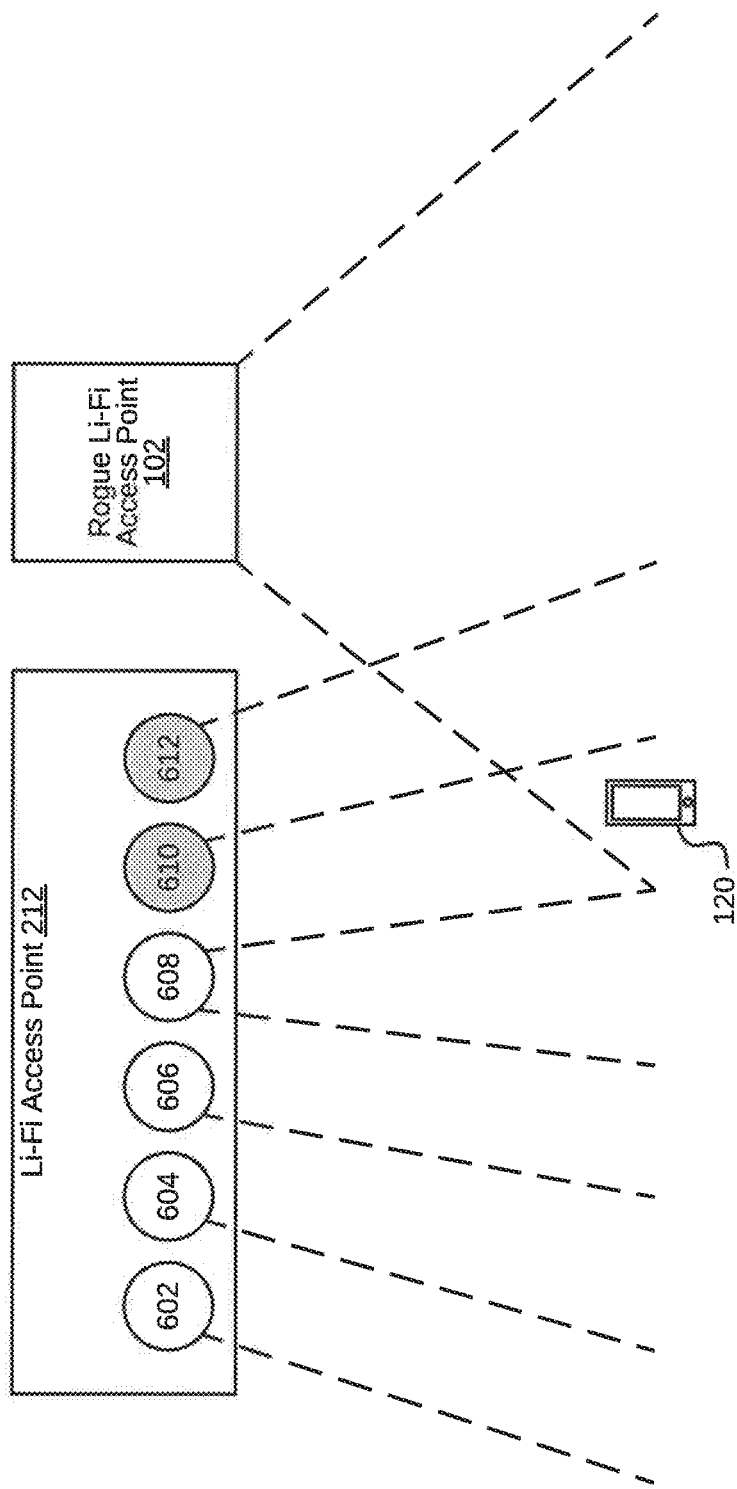
FIG. 6 illustrates mitigation of interference between a Li-Fi access point and a rogue Li-Fi access points illustrated, in accordance with an exemplary embodiment.

Referring now to FIG. 6, mitigation of interference between the Li-Fi access point 212 and the rogue Li-Fi access point 102 is illustrated, in accordance with an exemplary embodiment. The Li-Fi access point 212 may include six LEDs, i.e., LEDs 602, 604, 606, 608, 610, and 612. It may be noted that each of the six LEDs 602, 604, 606, 608, 610, and 612 may receive an average Direct Current (DC) voltage ($V_{DC}$) from a power source. Further, the power source may supply each of the six LEDs with a modulated signal (one of ($V_{DC}$+v) or ($V_{DC}$−v) depending on an input bit of 1 or 0) for data transmission. It may be noted that the modulated signal may be decoded by a decoder (for example, the decoder 308 of the Li-Fi access point 302 or the decoder 322 of the UE 304).

The data signal region of the rogue Li-Fi access point 102 may interfere with the data signal region of the Li-Fi access point 212. In particular and as depicted in FIG. 6, the data signal region of the rogue Li-Fi access point 102 may interfere with the data signal region of the LEDs 610 and 612. In some embodiments, at least one of the coordinator 202b and the master coordinator 204 may identify the LEDs 610 and 612 as experiencing interference from the rogue Li-Fi access point 102. In response to identifying the LEDs 610 and 612, at least one of one of the coordinator 202b and the master coordinator 204 may disable the data transmission from the LEDs 610 and 612. The LEDs 610 and 612 may still be used for illumination. It may be noted that since the data signal region of each of the LEDs 602, 604, 606, and 608 does not interfere with the data signal region of the rogue Li-Fi access point 102, at least one of the coordinator 202b and the master coordinator 204 may enable data transmission from the LEDs 602, 604, 606, and 608.

The LEDs 610 and 612 may be identified by leveraging a location of the UE 120 and coverage area of each the LEDs 602, 604, 606, 608, 610, and 612, based on measurement reports received from the UE 120 for each LED. Each measurement report may also include an identifier associated with an LED. In an exemplary scenario, as the UE 120 may move from the LED 602 to the LED 612, the CQI may gradually decrease and the RSSI may gradually increase. In such a scenario, the CQI and the RSSI may be used to map the location of the UE 120. It may be noted that the LEDs 610 and 612 may be precisely identified using the associated CQI and RSSI.

Figures 7, 8:
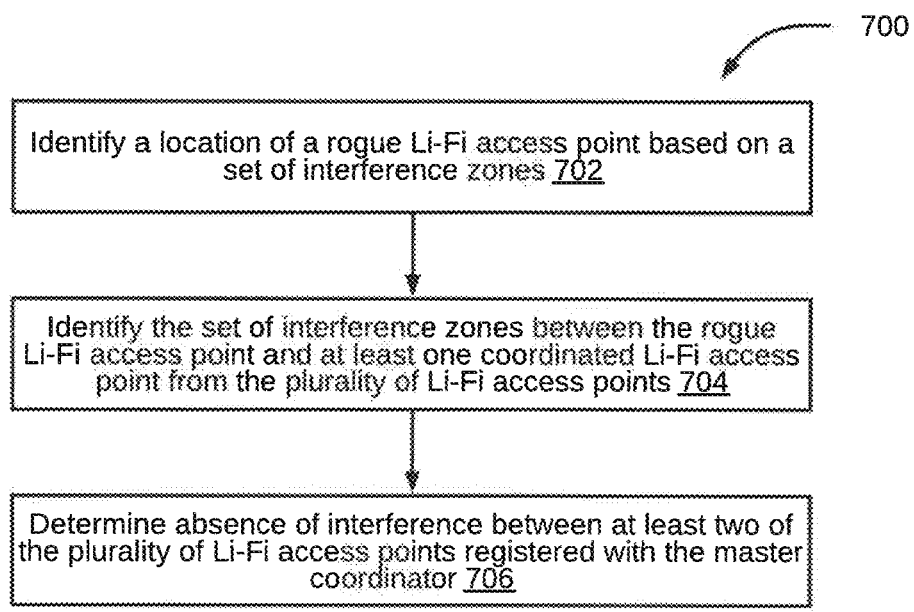
FIG. 7 is a flow diagram of an exemplary control logic for identifying a location of the rogue Li-Fi access point, in accordance with some embodiments.
FIG. 8 illustrates interference zones between coverage areas of three Li-Fi access points and a coverage area of a rogue Li-Fi access point, in accordance with an exemplary embodiment.

Referring now to FIG. 7, an exemplary control logic 700 for identifying a location of the rogue Li-Fi access point 102 is depicted via a flow chart, in accordance with some embodiments. Once it is determined that interference is being caused by the rogue Li-Fi access point 102, not only is it important to mitigate the interference, but to also identify location of the rogue Li-Fi access point 102. As illustrated in the flowchart, the control logic 700 may include identifying a location of the rogue Li-Fi access point 102 based on a set of interference zones, at step 702. In some embodiments, identifying the location may include performing triangulation based on the set of interference zones. Further, the control logic 700 may include identifying the set of interference zones between the rogue Li-Fi access point 102 and at least one coordinated Li-Fi access point from the plurality of Li-Fi access points, at step 704. By way of an example, the coordinated Li-Fi access points may include the Li-Fi access points 208, 210, and 212. It may be noted that each of the set of interference zones may correspond to a region of interference between the at least one coordinated Li-Fi access point and the rogue Li-Fi access point. In continuation of the example above, three interference zones may be formed between each of the Li-Fi access points 208, 210, and 212 and the rogue Li-Fi access point 102. Further, the control logic 700 may include determining absence of interference between one or more of the at least on coordinated Li-Fi access point registered with the master coordinator 204 and the rogue Li-Fi access point 102, at step 706. This is further explained in detail in conjunction with FIG. 8.

Referring now to FIG. 8, interference zones between coverage areas 802, 804, and 806 of three Li-Fi access points and a coverage area 808 of the rogue Li-Fi access point 102 are illustrated, in accordance with an exemplary embodiment. The interference zones may be used to precisely identify the location of the rogue Li-Fi access point 102. The coverage area 808 corresponds to a data signal region of the rogue Li-Fi access point 102 and the coverage areas 802, 804, and 806 correspond to data signal regions of three coordinated Li-Fi access points, i.e., Li-Fi access points 208, 210, and 212 respectively. As will be appreciated, the rogue Li-Fi access point 102 degrades quality of data transmission for the three coordinated Li-Fi access points in vicinity of the rogue Li-Fi access point 102. Thus, it is required to entirely eliminate the rogue Li-Fi access point 102 from data transmission. It may be noted that a precise geolocation of the rogue Li-Fi access point 102 and the coverage area 808 of the rogue Li-Fi access point 102 that may be determined with respect to the three coordinated Li-Fi access points may be reported to law enforcement agencies for subsequent removal of the rogue Li-Fi access point 102

The coverage areas 802, 804, and 806 may interfere with the coverage area 808 and may be mapped by the master coordinator 204. In some embodiments, a measurement report of a plurality of UEs associated with the three coordinated Li-Fi access points may be collected at the master coordinator 204. It may be noted that a decrease in the CQI and a simultaneous increase in the RSSI may indicate an interference with the rogue Li-Fi access point 102. Further, individual interference regions between the coverage areas 802, 804, and 806 with the coverage area 808 may be determined by correlating the CQI and RSSI of each of the three coordinated Li-Fi access points. Further, the master coordinator 204 may extrapolate the information of the individual interference regions between the coverage areas 802, 804, and 806 and the coverage area 808. A map of the coverage areas 802, 804, and 806 may then be reported to the law enforcement authorities to eliminate the rogue Li-Fi access point 102 from the vicinity of each of the three coordinated Li-Fi access points in order to improve respective data transmission.

In some embodiments, the rogue Li-Fi access point 102 may interfere with a first Li-Fi access point (for example, the Li-Fi access point 212. It may be noted that both the rogue Li-Fi access point 102 and the first Li-Fi access point may share a common interference region, which, for example, may be because of common time slot and/or phase, etc. A coverage area of the rogue Li-Fi access point 102 may be estimated based on the common interference region.

Further, a precision of the estimation of the coverage area of the rogue Li-Fi access point 102 may be improved based on interference information related to other Li-Fi access points that share the common channel (phase, time slot, etc.) received from the coordinator associated with the first Li-Fi access point, or one of other coordinators in the Li-Fi communication network. In some embodiments, a serving coordinator may request other coordinators through the master coordinator 204 to identify Li-Fi access points that are not interfering with the rogue Li-Fi access point 102, but share the same channel (i.e., phase, time slot, etc.). Further, the precision of estimation of the coverage area of the rogue Li-Fi access point 102 may be improved by eliminating the coverage area of the non-interfering Li-Fi access points (yet sharing the same channel).

By way of an example, the serving coordinator may receive the information about two non-interfering Li-Fi access points associated with a common coordinator, and sharing the common channel with the rogue Li-Fi access point 102. In such scenarios, the precision of estimation of the coverage area of the rogue Li-Fi access point 102 may be improved by eliminating the coverage area of the two non-interfering Li-Fi access points from the coverage area of the rogue Li-Fi access point 102.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives. CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will further be appreciated by those skilled in the art, current Li-Fi systems lack the mechanism to overcome interference caused by rogue Li-Fi access points modulated using a white light (single carrier). The techniques described above provide for identifying and mitigating interference caused by a rogue Light Li-Fi access point in a Li-Fi communication network. In particular, the above techniques provide for detecting and mitigating interference between the set of Li-Fi access points, associated with different coordinators, by allocating a unique phase to each of the set of Li-Fi access points, transmitting data signals from each of the set of Li-Fi access points in a time shift manner, dynamically evaluating CQI of each of the Li-Fi access points for a UE, and attaching/handing over the UE to a Li-Fi access point with the highest CQI. Further, the techniques provide for mitigating interference between a rogue Li-Fi access point and a coordinated access point by detecting interference in a first set of LEDs from the plurality of LEDs caused by a rogue Li-Fi access point, disabling data transmission from the first set of LEDs in response to detecting the interference, and enabling data transmission from a second set of LEDs from the plurality of LEDs.

The specification has described method and system for identifying interference caused by a rogue Li-Fi access point in a Li-Fi communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying interference caused by a rogue Light Fidelity (Li-Fi) access point in a Li-Fi communication network, the method comprising:

receiving, by an interference management device, a plurality of uplink data frames sent by a User Equipment (UE), wherein each of the plurality of uplink data frames comprises a current Channel Quality Indication (CQI) and a current Received Signal Strength Indicator (RSSI);

comparing, by the interference management device, the current CQI with at least one preceding CQI associated with the UE and the current RSSI with at least one preceding RSSI associated with the UE;

detecting, by the interference management device, an interference between a serving Li-Fi access point associated with the UE and a non-serving Li-Fi access point, when the current CQI is less than the at least one preceding CQI and the current RSSI is greater than the at least one preceding RSSI; and establishing, by the interference management device, the non-serving Li-Fi access point as the rogue Li-Fi access point, when the non-serving Li-Fi access point is not registered with a master coordinator within the Li-Fi communication network.

2. The method of claim 1 further comprising registering a plurality of Li-Fi access points through a set of coordinators, with the master coordinator within the Li-Fi communication network, wherein the plurality of Li-Fi access points comprises the serving Li-Fi access point.

3. The method of claim 2, wherein the master coordinator manages the set of coordinators, and wherein each of the set of coordinators manages a set of Li-Fi access points from the plurality of Li-Fi access points.

4. The method of claim 3, wherein the non-serving Li-Fi access point is not registered with each of the set of coordinators.

5. The method of claim 4, wherein establishing the non-serving Li-Fi access point as the rogue Li-Fi access point comprises:

enquiring registration details of the non-serving Li-Fi access point, through a serving coordinator from the set of coordinators, with the master coordinator; and determining absence of registration details for the non-serving Li-Fi access point in the master coordinator.

6. The method of claim 2, further comprising identifying a location of the rogue Li-Fi access point based on a set of interference zones, wherein identifying the location comprises performing triangulation based on the set of interference zones.

7. The method of claim 6, further comprising identifying the set of interference zones between the rogue Li-Fi access point and at least one coordinated Li-Fi access point from the plurality of Li-Fi access points, wherein each of the set of interference zones corresponds to a region of interference between the at least one coordinated Li-Fi access point and the rogue Li-Fi access point.

8. The method of claim 7 further comprising determining absence of interference between at least two of the plurality of Li-Fi access points registered with the master coordinator.

9. An interference management device for identifying interference caused by a rogue Light Fidelity (Li-Fi) access point in a Li-Fi communication network, the interference management device comprising:

a processor;

a computer readable medium comprising processor instructions, which when executed by the processor, cause the processor to:

receive a plurality of uplink data frames sent by a User Equipment (UE), wherein each of the plurality of uplink data frames comprises a current Channel Quality Indication (CQI) and a current Received Signal Strength Indicator (RSSI);

compare the current CQI with at least one preceding CQI associated with the UE and the current RSSI with at least one preceding RSSI associated with the UE;

detect an interference between a serving Li-Fi access point associated with the UE and a non-serving Li-Fi access point, when the current CQI is less than the at least one preceding CQI and the current RSSI is greater than the at least one preceding RSSI; and establish the non-serving Li-Fi access point as the rogue Li-Fi access point, when the non-serving Li-Fi access point is not registered with a master coordinator within the Li-Fi communication network.

10. The interference management device of claim 9, wherein the processor instruction further cause the processor to register a plurality of Li-Fi access points through a set of coordinators, with the master coordinator within the Li-Fi communication network, wherein the plurality of Li-Fi access points comprises the serving Li-Fi access point.

11. The interference management device of claim 10, wherein the master coordinator manages the set of coordinators, and wherein each of the set of coordinators manages a set of Li-Fi access points from the plurality of Li-Fi access points.

12. The interference management device of claim 11, wherein to establish the non-serving Li-Fi access point as the rogue Li-Fi access point, the processor instruction further cause the processor to:

enquire registration details of the non-serving Li-Fi access point, through a serving coordinator from the set of coordinators, with the master coordinator; and determine absence of registration details for the non-serving Li-Fi access point in the master coordinator.

13. The interference management device of claim 10, wherein the processor instruction further cause the processor to identify a location of the rogue Li-Fi access point based on a set of interference zones, wherein identifying the location comprises performing triangulation based on the set of interference zones.

14. The interference management device of claim 13, wherein the processor instruction further cause the processor to identify the set of interference zones between the rogue Li-Fi access point and at least one coordinated Li-Fi access point from the plurality of Li-Fi access points, wherein each of the set of interference zones corresponds to a region of interference between the at least one coordinated Li-Fi access point and the rogue Li-Fi access point.

15. The interference management device of claim 13, wherein the processor instruction further cause the processor to determine absence of interference between at least two of the plurality of Li-Fi access points registered with the master coordinator.

* * * * *